(12) United States Patent
Okuda

(10) Patent No.: US 10,353,281 B2
(45) Date of Patent: Jul. 16, 2019

(54) PROJECTION DISPLAY APPARATUS

(71) Applicant: Panasonic Intellectual Property Management Co., Ltd., Osaka (JP)

(72) Inventor: Michihiro Okuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/899,443

(22) Filed: Feb. 20, 2018

(65) Prior Publication Data

US 2018/0259839 A1 Sep. 13, 2018

(30) Foreign Application Priority Data

Mar. 8, 2017 (JP) .................................. 2017-043913
Dec. 18, 2017 (JP) .................................. 2017-241283

(51) Int. Cl.
G03B 21/20 (2006.01)
G03B 21/28 (2006.01)
G02B 27/09 (2006.01)
G02B 27/14 (2006.01)
G02B 26/00 (2006.01)

(52) U.S. Cl.
CPC ........... *G03B 21/28* (2013.01); *G02B 26/008* (2013.01); *G02B 27/0972* (2013.01); *G02B 27/141* (2013.01)

(58) Field of Classification Search
CPC ... G03B 21/28; G02B 27/0972; G02B 27/141
See application file for complete search history.

(56) References Cited

U.S. PATENT DOCUMENTS

| 5,658,060 A * | 8/1997 | Dove ................... H04N 9/3105 348/E9.027 |
| 2002/0057499 A1* | 5/2002 | Sugawara ............ H04N 9/3105 359/634 |
| 2005/0179876 A1 | 8/2005 | Iinuma et al. |

(Continued)

FOREIGN PATENT DOCUMENTS

| JP | 2005-234124 | 9/2005 |
| JP | 2007-248794 | 9/2007 |

(Continued)

*Primary Examiner* — Sultan Chowdhury
*Assistant Examiner* — Magda Cruz
(74) *Attorney, Agent, or Firm* — Wenderoth, Lind & Ponack, L.L.P.

(57) ABSTRACT

The projection display apparatus according to the present disclosure includes: a light source part; a color separating mirror that separates light emitted from the light source part into a first color light and a second color light; a first light modulation element that modulates the first color light; a second light modulation element that modulates the second color light; a color combining prism unit that combines the first color light modulated by the first light modulation element and the second color light modulated by the second light modulation element; and a projection unit that projects combined light emitted from the color combining prism unit. The color combining prism unit includes four prisms and has two air gap faces that totally reflect or transmit light depending on the angle of incidence.

19 Claims, 6 Drawing Sheets

(56) References Cited

U.S. PATENT DOCUMENTS

| | | | | |
|---|---|---|---|---|
| 2006/0262275 | A1* | 11/2006 | Domroese | G03B 21/14 353/20 |
| 2007/0216869 | A1 | 9/2007 | Kawase et al. | |
| 2008/0094683 | A1 | 4/2008 | Chen et al. | |
| 2014/0347634 | A1* | 11/2014 | Bommerbach | H04N 9/3158 353/31 |

FOREIGN PATENT DOCUMENTS

| | | |
|---|---|---|
| JP | 2010-097002 | 4/2010 |
| JP | 2014-021223 | 2/2014 |

* cited by examiner

PROJECTION DISPLAY APPARATUS

BACKGROUND

1. Technical Field

The present disclosure relates to a two-plate-type projection display apparatus which displays images using two reflective display elements.

2. Description of the Related Art

Patent Literature (PTL) 1 (Unexamined Japanese Patent Publication No. 2010-097002) discloses a two-plate-type projection device which includes a TIR prism, a dichroic prism, two reflective spatial light modulation elements, and a polarizing element and further includes an optical system that switches the polarization direction of light of each of R, G, B colors by time-division so that high-quality color images can be projected.

CITATION LIST

Patent Literature

PTL 1: Unexamined Japanese Patent Publication No. 2010-097002

SUMMARY

The present disclosure provides a projection display apparatus which has the two-plate-type configuration using two reflective display elements and is capable of displaying bright images without complicated configurations.

The projection display apparatus according to the present disclosure includes: a light source part; a color separating mirror that separates light emitted from the light source part into a first color light and a second color light; a first light modulation element that modulates the first color light; a second light modulation element that modulates the second color light; a color combining prism unit that combines the first color light modulated by the first light modulation element and the second color light modulated by the second light modulation element; and a projection unit that projects combined light emitted from the color combining prism unit. The color combining prism unit includes four prisms and has two air gap faces that totally reflect or transmit light depending on the angle of incidence.

According to the present disclosure, bright projection light is obtained with a simple configuration of the two-plate-type in which two reflective display elements are used.

DETAILED DESCRIPTION

Hereinafter, exemplary embodiments will be described in detail with reference to the drawings as necessary. However, there are instances where overly detailed description is omitted. For example, detailed description of well-known matter, overlapping description of substantially identical elements, etc., may be omitted. This is to prevent the subsequent description from becoming unnecessarily redundant, and thus facilitate understanding by a person having ordinary skill in the art.

Note that the accompanying drawings and the subsequent description are provided so that a person having ordinary skill in the art is able to sufficiently understand the present disclosure, and are not intended to limit the scope of the subject matter recited in the claims.

First Exemplary Embodiment

Projection Display Apparatus

Figure 1:
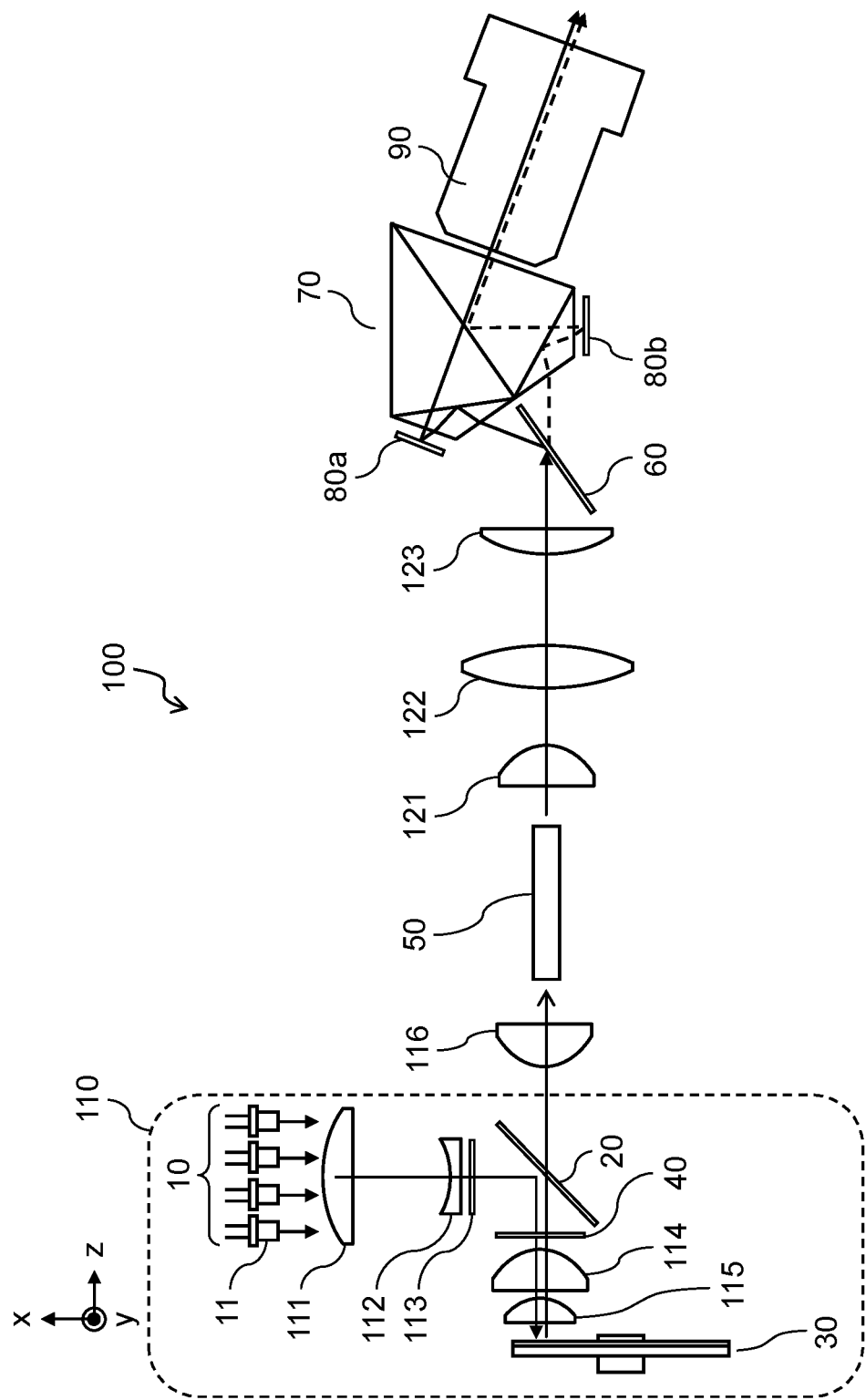
FIG. 1 illustrates a projection display apparatus according to the first exemplary embodiment.

Hereinafter, the configuration of a projection display apparatus according to the first exemplary embodiment will be described with reference to FIG. 1 to FIG. 4. FIG. 1 illustrates an optical configuration of projection display apparatus 100 according to the first exemplary embodiment.

As illustrated in FIG. 1, projection display apparatus 100 includes: light source unit 10, dichroic mirror 20, phosphor wheel 30, A14 plate 40, rod integrator 50, color separating mirror 60, color combining prism unit 70, two digital mirror devices (DMDs) (first DMD 80a and second DMD 80b), and projection unit 90.

Light source unit 10 includes, for example, a plurality of solid-state light sources such as laser diodes (LDs) and light-emitting diodes (LEDs). In the present exemplary embodiment, laser diodes, particularly, laser diodes 11 which emit blue light, are used as the solid-state light sources.

Light emitted from light source unit 10 is blue light having a wavelength of 455 nm and is used as imaging light and also used as excitation light for exciting a phosphor in phosphor wheel 30. Note that the wavelength of the blue light which light source unit 10 emits is not limited to 455 nm and may be, for example, a wavelength of 440 nm to 460 nm.

The blue light emitted from light source unit 10 passes through lens 111, lens 112, and diffusion plate 113 and enters dichroic mirror 20. Dichroic mirror 20 reflects the blue light. The blue light reflected by dichroic mirror 20 is collected by lenses 114 and 115 and excites the phosphor in phosphor wheel 30 so that the phosphor emits light.

The light emitted from light source unit 10 is s-polarized blue light, and dichroic mirror 20 reflects the s-polarized blue light and transmits yellow luminescent light emitted by phosphor wheel 30 and p-polarized blue light reflected by phosphor wheel 30. Thus, dichroic mirror 20 reflects the s-polarized blue light and transmits the p-polarized blue light and the non-polarized yellow luminescent light.

Light source unit 10 including laser diodes 11, lens 111, lens 112, diffusion plate 113, dichroic mirror 20, lenses 114 and 115, phosphor wheel 30, and λ/4 plate 40 form light source part 110.

Figure 2:
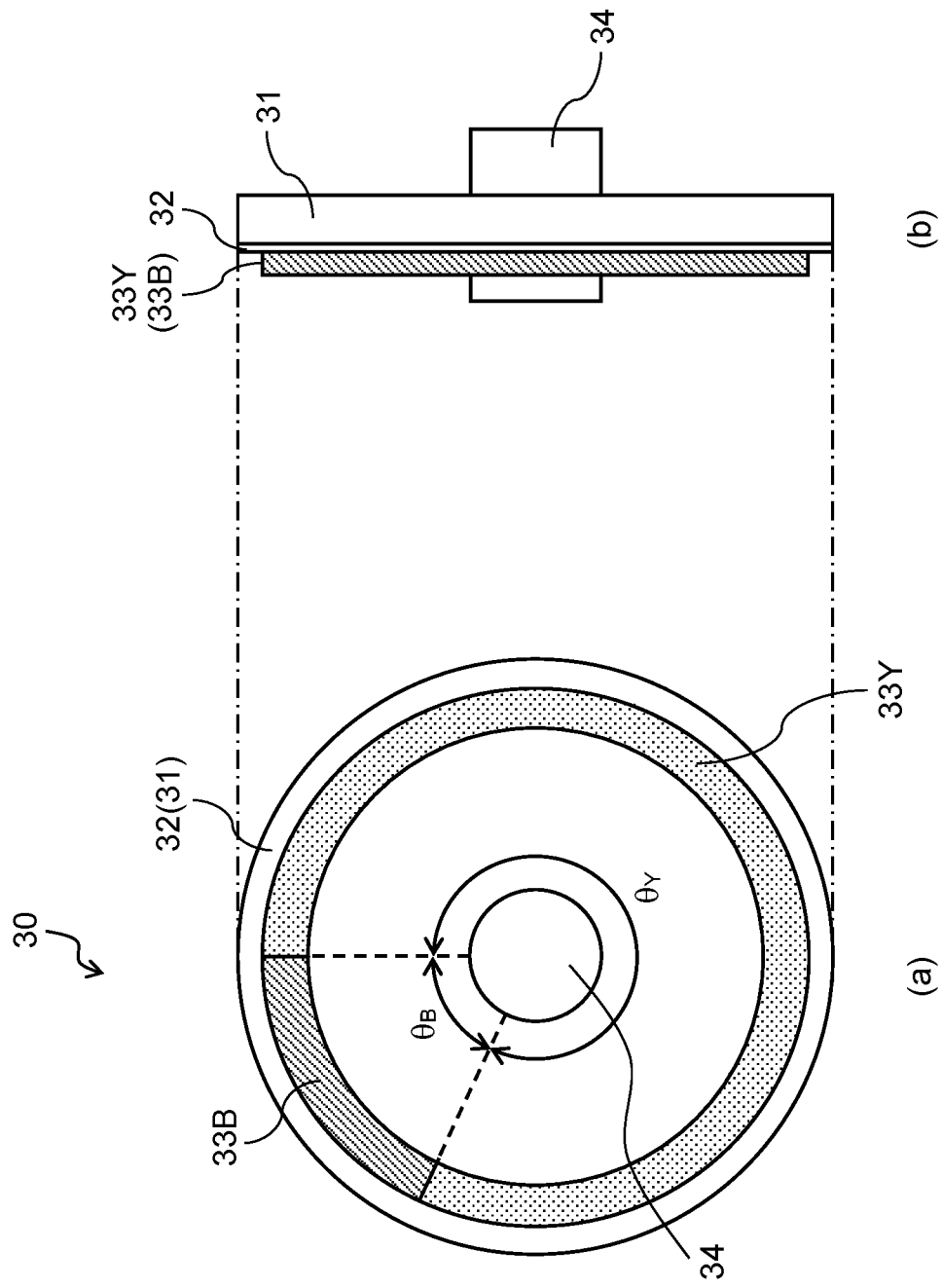
FIG. 2 illustrates a phosphor wheel according to the first exemplary embodiment.

As illustrated in FIG. 2, phosphor wheel 30 includes: substrate 31; reflection coating 32 formed on substrate 31; yellow phosphor coating 33Y and diffusion layer 33B formed on reflection coating 32 by coating in a circular annular shape; and motor 34 for rotating substrate 31. In FIG. 2, (a) illustrates phosphor wheel viewed in the negative direction of the z axis in FIG. 1, and (b) illustrates phosphor wheel viewed along the y axis in FIG. 1.

Yellow phosphor coating 33Y can be produced, for example, by applying a mixture of powdery ceramic phosphor with an adhesive (silicone resin) to the substrate and curing the mixture at high temperature. The ceramic phosphor to be used for yellow phosphor coating 33Y is, for example, an YAG phosphor or a LAG phosphor which has a cerium-activated garnet structure.

Phosphor wheel 30 includes two segments in a circumferential direction, as illustrated in (a) in FIG. 2. A first segment (angle region $\theta_Y$) is for generating yellow light Ye. A second segment (angle region $\theta_B$) is for generating blue light B.

Yellow phosphor coating 33Y includes phosphor Y which emits yellow luminescent light according to the blue light (excitation light) emitted from light source unit 10. Note that yellow phosphor coating 33Y is a region that is irradiated with the blue light (excitation light) during rotation of phosphor wheel 30. In other words, lens 115 collects the blue light onto yellow phosphor coating 33Y.

Diffusion layer 33B diffuses the blue light (imaging light) emitted from light source unit 10 while maintaining the polarization of the blue light. For example, diffusion layer 33B has a refractive diffusion structure.

Returning to FIG. 1, when the blue light (excitation light) irradiates the first segment (angle region $\theta_Y$) of the phosphor wheel, luminescent yellow light Ye is collimated by lens 114 and lens 115 and passes through dichroic mirror 20, and the light emitted from dichroic mirror 20 is collected into rod integrator 50 by lens 116.

When the blue light (imaging light) irradiates the second segment (angle region $\theta_B$) of the phosphor wheel, the s-polarized blue light is converted into circularly polarized light by passing through $\lambda/4$ plate 40, is reflected by reflection coating 32 and diffused on diffusion layer 33B in phosphor wheel 30, and is converted into p-polarized light by passing through $\lambda/4$ plate 40 again. Blue light B that has been converted into the p-polarized light passes through dichroic mirror 20 and is collected into rod integrator 50 by lens 116.

Thus, phosphor wheel 30 generates yellow light Ye by allowing the first segment (angle region $\theta_Y$) to be irradiated with the blue light which serves as excitation light, and generates blue light B which serves as imaging light by allowing the second segment (angle region $\theta_B$) to be irradiated with the blue light. Furthermore, phosphor wheel 30 rotates to generate yellow light Ye and blue light B (imaging light) by time-division. Thus, yellow light Ye and blue light B (imaging light) enter rod integrator 50 by time-division, thus entering rod integrator 50 as white light in terms of time average.

Rod integrator 50 is a solid rod formed of a transparent member such as glass. Rod integrator 50 homogenizes the white light (yellow light Ye+blue light B) generated by phosphor wheel 30. Note that rod integrator 50 may be a solid rod having a mirror surface as an inner wall. Rod integrator 50 is one example of a light-homogenizing element.

Lens 121, lens 122, and lens 123 are a relay optical system that guides the light homogenized by rod integrator 50 to DMD 80a and DMD 80b via color separating mirror 60.

Figure 3:
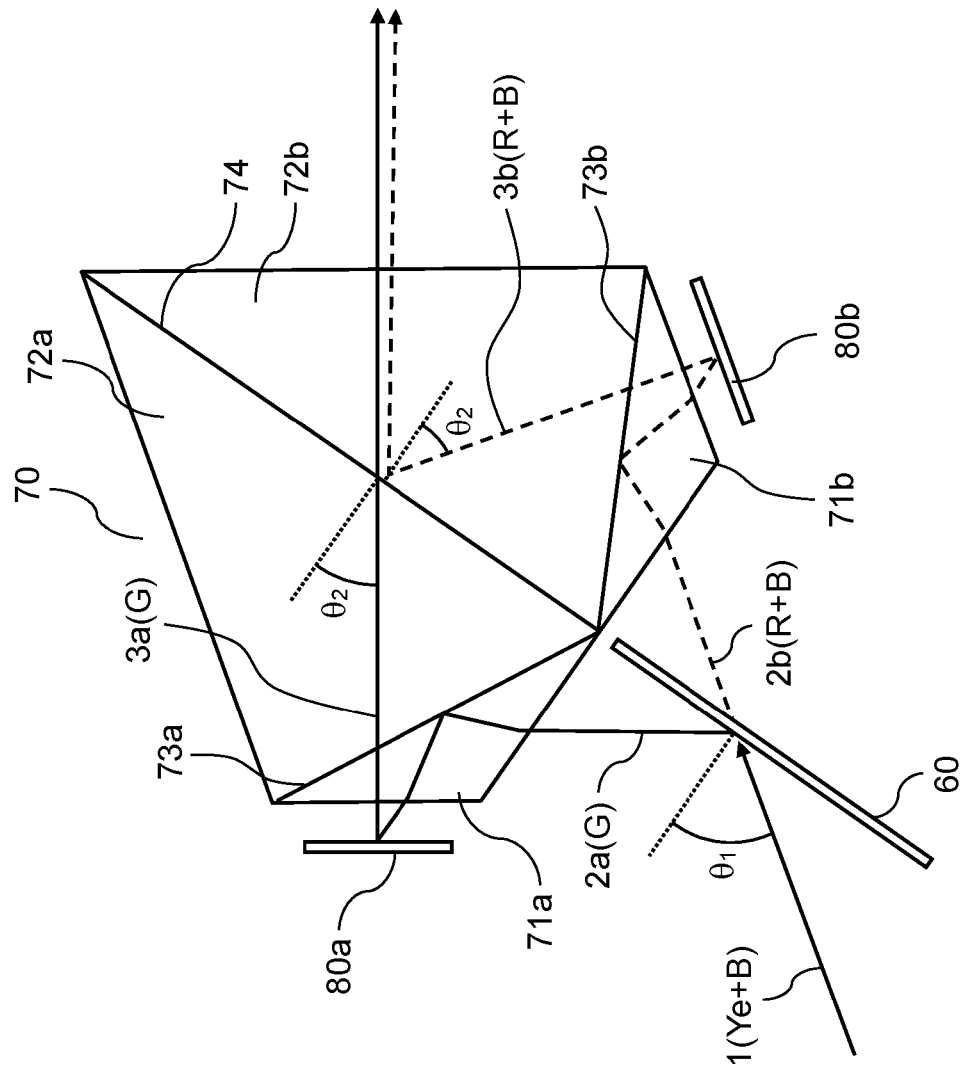
FIG. 3 illustrates details of a color separating/combining unit according to the first exemplary embodiment.

Next, the details of a color separating/combining unit will be described with reference to FIG. 3. The color separating/combining unit illustrated in FIG. 3 includes color separating mirror 60, color combining prism unit 70, first DMD 80a, and second DMD 80b. In FIG. 3, the solid lines and the dashed lines indicate only rays (reference rays) passing through the center of an optical axis.

Color separating mirror 60 is a dichroic mirror that separates the white light emitted from rod integrator 50 between an optical path leading to first DMD 80a and an optical path leading to second DMD 80b. In the present exemplary embodiment, color separating mirror 60 reflects green light G and transmits red light R and blue light B. Specifically, as illustrated in FIG. 3, color separating mirror 60 separates white illuminating light 1 (Ye+B) into first illuminating light 2a (G) and second illuminating light 2b (R+B). First illuminating light 2a (G) is one example of the first color light, and second illuminating light 2b (R+B) is one example of the second color light.

Color combining prism unit 70 is an integrated prism unit in which four prisms, namely, prism 71a, prism 71b, prism 72a, and prism 72b, are bonded to one another via first air gap face 73a, second air gap face 73b, and dichroic coating 74, as illustrated in FIG. 3.

In FIG. 3, the four prisms, i.e., prism 71a, prism 71b, prism 72a, and prism 72b, included in color combining prism unit 70 are in the shape of a triangular prism having a certain thickness in the depth direction of the figure (a direction perpendicular to the figure). Two of the four prisms included in color combining prism unit 70, specifically, prism 71a and prism 71b, are shaped and arranged plane-symmetric about a plane including dichroic coating 74 as a plane of symmetry. Prism 72a and prism 72b are shaped and arranged plane-symmetric about a plane including dichroic coating 74 as a plane of symmetry. More specifically, two of the four prisms included in color combining prism unit 70, specifically, prism 72a and prism 72b, are arranged opposite to each other across dichroic coating 74.

In the present exemplary embodiment, prism 71a, prism 71b, prism 72a, and prism 72b are the same glass material that is BK7. The glass material may be any available material for optical use and can be changed according to the optical design.

First air gap face 73a and second air gap face 73b are provided with tiny clearance (air layer) such that when the angle of incidence of a ray with respect to the air gap face exceeds the critical angle, the ray is totally reflected. On the other hand, first air gap face 73a and second air gap face 73b are bonded with an adhesive in a region where no light enters. The air gap clearance may be, for example, approximately 2 μm to 10 μm.

In the present exemplary embodiment, dichroic coating 74 reflects red light R and blue light B and transmits green light G. Dichroic coating 74 is a coating of a surface of prism 72a or prism 72b, and prism 72a and prism 72b are optically in contact via an adhesive. Prism 72a and prism 72b may be joined by optical contact bonding. Color combining prism unit 70 is a prism that has the functions of both a TIR prism and a dichroic prism which are commonly used in a projection display apparatus using a DMD.

First DMD 80a and second DMD 80b modulate the light homogenized by rod integrator 50. Specifically, each of first DMD 80a and second DMD 80b is a reflective display element including a plurality of micromirrors that are movable. Each of the micromirrors is basically equivalent to one pixel. First DMD 80a and second DMD 80b switch between ON light (projection light) and OFF light (unnecessary light) by the modulation operation of changing the angle of each of the micromirrors according to an image signal. First DMD 80a is one example of a first light modulation element, and second DMD 80b is one example of a second light modulation element.

First illuminating light 2a (G) reflected by color separating mirror 60 enters prism 71a, is totally reflected by first air gap face 73a, and irradiates first DMD 80a. The shape of the prism is determined such that the angle of incidence of first illuminating light 2a (G) with respect to first air gap face 73a exceeds the critical angle. In the present exemplary embodiment, the critical angle is calculated to be 41.18 degrees because the glass material is BK7 and the refractive index is 1.5187 (at a wavelength of 546.1 nm). First projection light 3a (G) converted by first DMD 80a into ON light enters prism 71a again, passes through first air gap face 73a, and passes through dichroic coating 74.

The shape of the prism is determined such that the angle of incidence of first projection light 3a (G) with respect to first air gap face 73a is less than the critical angle. The reference ray of first projection light 3a (G) emitted from first DMD 80a is perpendicular to first DMD 80a. In other words, the angle of incidence of the reference ray of first illuminating light 2a (G) with respect to first DMD 80a is adjusted so that the reference ray of first projection light 3a (G) becomes perpendicular to first DMD 80a. In the present exemplary embodiment, the angle of incidence of the reference ray of first illuminating light 2a (G) with respect to first DMD 80a is 34 degrees.

Second illuminating light 2b (R+B) transmitted by color separating mirror 60 enters prism 71b, is totally reflected by second air gap face 73b, and irradiates second DMD 80b. The shape of the prism is determined such that the angle of incidence of second illuminating light 2b (R+B) with respect to second air gap face 73b exceeds the critical angle. In the present exemplary embodiment, the critical angle is calculated to be 41.18 degrees because the glass material is BK7 and the refractive index is 1.5187 (at a wavelength of 546.1 nm). Second projection light 3b (R+B) converted by second DMD 80b into ON light enters prism 71b again, passes through second air gap face 73b, and is reflected by dichroic coating 74.

The shape of the prism is determined such that the angle of incidence of second projection light 3b (R+B) with respect to second air gap face 73b is less than the critical angle. The reference ray of second projection light 3b (R+B) emitted from second DMD 80b is perpendicular to second DMD 80b. In other words, the angle of incidence of the reference ray of second illuminating light 2b (R+B) with respect to second DMD 80b is adjusted so that the reference ray of second projection light 3b (R+B) becomes perpendicular to second DMD 80b. In the present exemplary embodiment, the angle of incidence of the reference ray of second illuminating light 2b (R+B) with respect to second DMD 80b is 34 degrees.

Here, as illustrated in FIG. 3, suppose the angle of incidence of white illuminating light 1 (Ye+B) with respect to color separating mirror 60 (the angle formed between the surface normal and the reference ray) is denoted as angle of incidence $\theta_1$, and the angle of incidence of the reference ray of each of first projection light 3a (G) and second projection light 3b (R+B) with respect to dichroic coating 74 of color combining prism unit 70 (the angle formed between the surface normal and the reference ray) is denoted as angle of incidence $\theta_2$; angle of incidence $\theta_1$ and angle of incidence $\theta_2$ are preferably set to the smallest possible degree. Specifically, angle of incidence $\theta_1 \leq 60$ degrees and angle of incidence $\theta_2 \leq 45$ degrees are preferred. In the present exemplary embodiment, angle of incidence $\theta_1 = 55$ degrees and angle of incidence $\theta_2 = 35$ degrees, which satisfy angle of incidence $\theta_1 \leq 60$ degrees and angle of incidence $\theta_2 \leq 45$ degrees. With such angle settings, the coating design for color separating mirror 60 and the coating design for dichroic coating 74 are facilitated, allowing an increase in the efficiency of color separation and combination.

At the same time, angle of incidence $\theta_1$>angle of incidence $\theta_2$ is preferred. In the present exemplary embodiment, angle of incidence $\theta_1 = 55$ degrees and angle of incidence $\theta_2 = 35$ degrees, which satisfy angle of incidence $\theta_1$>angle of incidence $\theta_2$. With such angle settings, the coating design for color separating mirror 60 and the coating design for dichroic coating 74 are facilitated, allowing an increase in the efficiency of color separation and combination.

With this, first illuminating light 2a (G) and second illuminating light 2b (R+B) resulting from separation of white illuminating light 1 (Ye+B) by color separating mirror 60 are combined by color combining prism unit 70 and then are emitted as combined light.

Note that color separating mirror 60 is configured to reflect green light G and transmit red light R and blue light B in the present exemplary embodiment, but may be configured to reflect red light R and blue light B and transmit green light G. Furthermore, dichroic coating 74 is configured to reflect red light R and blue light B and transmit green light G in the present exemplary embodiment, but may be configured to reflect green light G and transmit red light R and blue light B.

Figure 4:
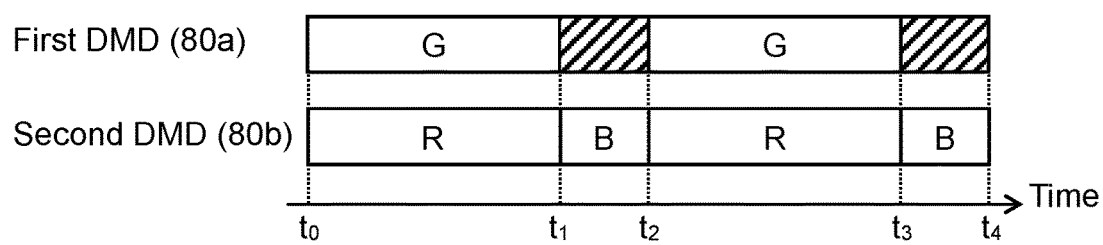
FIG. 4 illustrates an operation of a DMD according to the first exemplary embodiment.

Next, the principle of color image display using first DMD 80a and second DMD 80b will be described with reference to FIG. 4.

First DMD 80a represents the gradation of green light G by the modulation operation of each of the micromirrors on the basis of a green (G) image signal. Specifically, the gradation of green light G is represented between time $t_0$ and time $t_1$, no images are displayed between time $t_1$ and time $t_2$, the gradation of green light G is represented between time $t_2$ and time $t_3$, and no images are displayed between time $t_3$ and time $t_4$. Although not illustrated in the drawings, the same or similar process is repeated after time $t_4$ as well on the basis of the image signal.

Second DMD 80b represents the gradations of red light R and blue light B by the modulation operation of each of the micromirrors on the basis of a red (R) image signal and a blue (B) image signal. Specifically, the gradation of red light R is represented between time $t_0$ and time $t_1$, the gradation of blue light B is represented between time $t_1$ and time $t_2$, the gradation of red light R is represented between time $t_2$ and time $t_3$, and the gradation of blue light B is represented between time $t_3$ and time $t_4$. Although not illustrated in the drawings, the same or similar process is repeated after time $t_4$ as well on the basis of the image signal.

Note that the time interval between time $t_0$ and time $t_2$ (or time $t_2$ and time $t_4$) may be set as one frame of the images, or may be set as one sub-frame where three sub-frames form one frame of the images.

Here, time $t_0$ to time $t_1$ and time $t_2$ to time $t_3$ correspond to time for which the first segment (angle region $\theta_B$) of phosphor wheel 30 is irradiated with blue light as the excitation light. Specifically, between time $t_0$ and time $t_1$ and between time $t_2$ and time $t_3$, phosphor wheel 30 generates yellow light Ye, color separating mirror 60 separates the light into green light G and red light R, first DMD 80a is illuminated with green light G, and second DMD 80b is illuminated with red light R.

Here, time $t_1$ to time $t_2$ and time $t_3$ to time $t_4$ correspond to time for which the second segment (angle region $\theta_B$) of phosphor wheel 30 is irradiated with blue light as the imaging light. Specifically, between time $t_1$ and time $t_2$ and between time $t_3$ and time $t_4$, blue light B is reflected by phosphor wheel 30 and then separated by color separating mirror 60 to travel in an optical path leading to second DMD 80b so that second DMD 80b is illuminated with blue light B.

Operations and Advantageous Effects

In the first exemplary embodiment, in the two-plate-type configuration using two DMDs, the color combining prism unit including four prisms, two air gap faces, and one dichroic coating enables implementation of a small, simple optical system. Furthermore, by setting the angle of incidence of the reference ray with respect to dichroic coating 74 less than the angle of incidence of the reference ray with respect to color separating mirror 60, it is possible to increase the efficiency of color separation and combination, resulting in a bright projection display apparatus.

Second Exemplary Embodiment

In the first exemplary embodiment, color separating mirror 60 is configured to reflect green light G and transmit red light R and blue light B. Furthermore, in the first exemplary embodiment, dichroic coating 74 is configured to reflect red light R and blue light B and transmit green light G. Specifically, color separating mirror 60 is configured to separate white illuminating light 1 (Ye+B) into first illuminating light 2a (G) and second illuminating light 2b (R+B), and dichroic coating 74 of color combining prism unit 70 is configured to combine first projection light 3a (G) and second projection light 3b (R+B).

Figure 5:
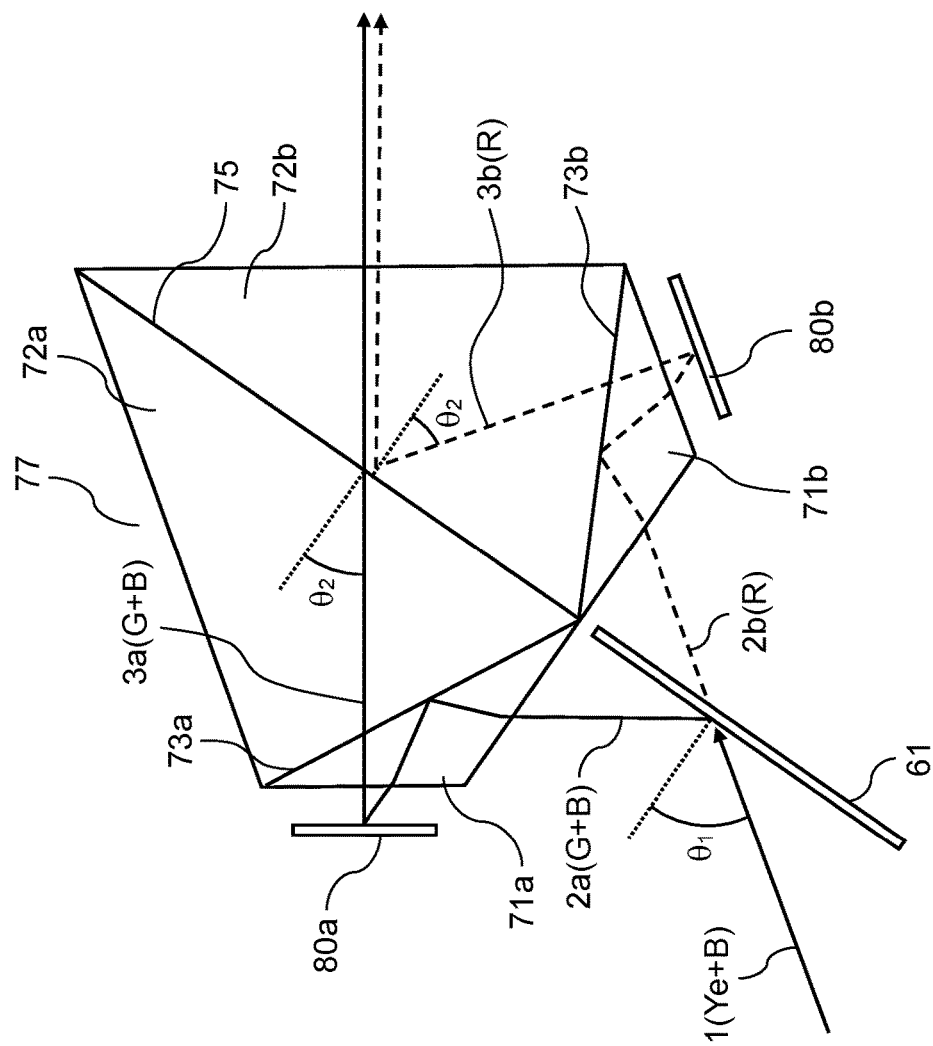
FIG. 5 illustrates details of a color separating/combining unit according to the second exemplary embodiment.

In the second exemplary embodiment, as illustrated in FIG. 5, color separating mirror 61 is provided instead of color separating mirror 60, and color separating mirror 61 reflects green light G and blue light B and transmits red light R. Furthermore, color combining prism unit 77 includes dichroic coating 75 instead of dichroic coating 74, and dichroic coating 75 transmits green light G and blue light B and reflects red light R. Specifically, color separating mirror 61 separates white illuminating light 1 (Ye+B) into first illuminating light 2a (G+B) and second illuminating light 2b (R), and dichroic coating 75 of color combining prism unit 77 combines first projection light 3a (G+B) and second projection light 3b (R). Thus, the color separating/combining unit illustrated in FIG. 5 includes color separating mirror 61, color combining prism unit 77, first DMD 80a, and second DMD 80b. First illuminating light 2a (G+B) is one example of the first color light, and second illuminating light 2b (R) is one example of the second color light. Elements that are the same as or similar to those in the first exemplary embodiment are assigned the same reference signs, and description thereof will be omitted.

As illustrated in FIG. 5, first illuminating light 2a (G+B) reflected by color separating mirror 61 enters prism 71a, is totally reflected by first air gap face 73a, and irradiates first DMD 80a. First projection light 3a (G+B) converted by first DMD 80a into ON light enters prism 71a again, passes through first air gap face 73a, and passes through dichroic coating 75. Second illuminating light 2b (R) transmitted by color separating mirror 61 enters prism 71b, is totally reflected by second air gap face 73b, and irradiates second DMD 80b. Second projection light 3b (R) converted by second DMD 80b into ON light enters prism 71b again, passes through second air gap face 73b, and is reflected by dichroic coating 75.

The angle of incidence of first illuminating light 2a (G+B) with respect to first air gap face 73a and first DMD 80a and the angle of incidence of first projection light 3a (G+B) with respect to first air gap face 73a are the same as or similar to those in the first exemplary embodiment. Likewise, the angle of incidence of second illuminating light 2b (R) with respect to second air gap face 73b and second DMD 80b and the angle of incidence of second projection light 3b (R) with respect to second air gap face 73b are the same as or similar to those in the first exemplary embodiment.

Furthermore, as illustrated in FIG. 5, angle of incidence $\theta_1$ of white illuminating light 1 (Ye+B) with respect to color separating mirror 61, angle of incidence $\theta_2$ of the reference ray of each of first projection light 3a (G+B) and second projection light 3b (R) with respect to dichroic coating 75 of color combining prism unit 77, and the relationship between angle of incidence $\theta_1$ and angle of incidence $\theta_2$ are the same as or similar to those in the first exemplary embodiment.

Note that color separating mirror 61 is configured to reflect green light G and blue light B and transmit red light R in the present exemplary embodiment, but may be configured to reflect red light R and transmit green light G and blue light B. Furthermore, dichroic coating 75 is configured to reflect red light R and transmit green light G and blue light B in the present exemplary embodiment, but may be configured to reflect green light G and blue light B and transmit red light R.

Figure 6:
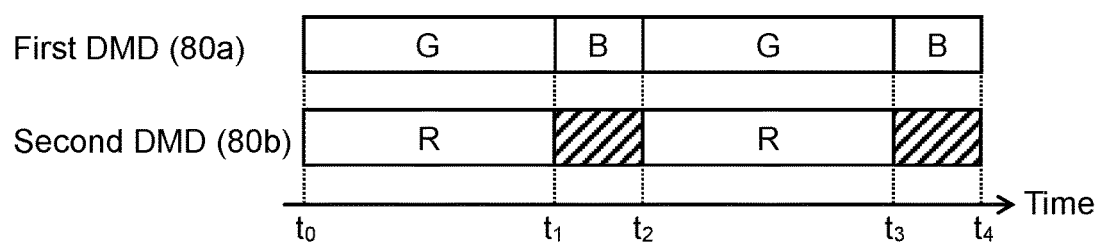
FIG. 6 illustrates an operation of a DMD according to the second exemplary embodiment.

The principle of color image display in the second exemplary embodiment will be described with reference to FIG. 6.

First DMD 80a represents the gradations of green light G and blue light B by the modulation operation of each of the micromirrors on the basis of the green (G) image signal and the blue (B) image signal. Specifically, the gradation of green light G is represented between time $t_0$ and $t_1$, the gradation of blue light B is represented between time $t_1$ and $t_2$, the gradation of green light G is represented between time $t_2$ and $t_3$, and the gradation of blue light B is represented between time $t_3$ and $t_4$. Although not illustrated in the drawings, the same or similar process is repeated after time $t_4$ as well on the basis of the image signal.

Second DMD 80b represents the gradation of red light R by the modulation operation of each of the micromirrors on the basis of the red (R) image signal. Specifically, the gradation of red light R is represented between time $t_0$ and $t_1$, no images are displayed between time $t_1$ and $t_2$, the gradation of red light R is represented between time $t_2$ and $t_3$, and no images are displayed between time $t_3$ and $t_4$. Although not illustrated in the drawings, the same or similar process is repeated after time $t_4$ as well on the basis of the image signal.

Here, as in the case of the first exemplary embodiment, time $t_0$ to time $t_1$ and time $t_2$ to time $t_3$ correspond to time for which the first segment (angle region $\theta_Y$) of phosphor wheel 30 is irradiated with blue light as the excitation light, and time $t_1$ to time $t_2$ and time $t_3$ to time $t_4$ correspond to time for which the second segment (angle region $\theta_B$) of phosphor wheel 30 is irradiated with blue light as the imaging light. In the second exemplary embodiment, between time $t_1$ and time $t_2$ and between time $t_3$ and time $t_4$, blue light B reflected by phosphor wheel 30 is separated by color separating mirror 61 to travel in an optical path leading to first DMD 80a and illuminates first DMD 80a.

Also in the case where the color separating/combining unit is configured using color combining prism unit 77 including color separating mirror 61 and dichroic coating 75 as in the second exemplary embodiment, the same or similar advantageous effects as in the first exemplary embodiment are produced.

Other Exemplary Embodiments

The first and second exemplary embodiments have been described above by way of example of techniques disclosed in the present application. The techniques according to the present disclosure, however, are not limited to the foregoing exemplary embodiments, and can also be applied to exemplary embodiments obtained by carrying out modification, substitution, addition, omission, etc. Furthermore, it is also possible to obtain a new embodiment by combining respective structural elements described in the first and second exemplary embodiments. In view of this, other exemplary embodiments will be given below as examples.

Although the blue light serving as the imaging light is produced through the diffusion on diffusion layer 33B and the reflection on reflection coating 32 in phosphor wheel 30 in the first and second exemplary embodiments, exemplary embodiments are not limited to these exemplary embodiments. Phosphor wheel 30 may have an opening in the portion where diffusion layer 33B is formed, allowing the blue light entering the second segment (angle region $\theta_B$) of the phosphor wheel to pass and be reflected by a mirror to be guided to dichroic mirror 20 again so as to be reflected by dichroic mirror 20 and thus guided to lens 116. This also can result in white light that includes blue light (imaging light) and yellow light by time-division.

Although the light modulation element is exemplified by first DMD 80a and second DMD 80b in the first and second exemplary embodiments, exemplary embodiments are not limited to these exemplary embodiments. The light modulation element may be a reflective liquid-crystal panel.

Note that the above exemplary embodiments are for providing examples of the techniques of the present disclosure, and thus various modifications, substitutions, additions, omissions, etc., are possible in the scope of the claims and equivalent scope thereof.

INDUSTRIAL APPLICABILITY

The present disclosure can be applied to a projection display apparatus such as a projector.

What is claimed is:

1. A projection display apparatus comprising:
a light source part;
a color separating mirror that separates light emitted from the light source part into a first color light and a second color light;
a first light modulation element that modulates the first color light;
a second light modulation element that modulates the second color light;
a color combining prism unit that combines the first color light modulated by the first light modulation element and the second color light modulated by the second light modulation element; and
a projection unit that projects combined light emitted from the color combining prism unit, wherein
the color combining prism unit includes a first prism, a second prism, a third prism and a fourth prism, the third and fourth prisms having a dichroic coating located therebetween,
the color combining prism unit has two air gap faces that totally reflect the first and second color lights before incidence on the first and second light modulation elements, respectively, and transmit the modulated first and second color lights after modulation by the first and second light modulation elements, respectively,
one of the two air gap faces is formed by a surface of the first prism and a surface of the third prism, and
another of the two air gap faces is formed by a surface of the second prism and a surface of the fourth prism.

2. The projection display apparatus according to claim 1, wherein
the third and fourth prisms included in the color combining prism unit are arranged opposite to each other across the dichroic coating, and an angle of incidence of a reference ray with respect to the dichroic coating is 45 degrees or less.

3. The projection display apparatus according to claim 1, wherein
the third and fourth prisms included in the color combining prism unit are arranged opposite to each other across the dichroic coating, and an angle of incidence of a reference ray with respect to the dichroic coating is less than an angle of incidence of the reference ray with respect to the color separating mirror.

4. The projection display apparatus according to claim 1, wherein
the third and fourth prisms included in the color combining prism unit are arranged opposite to each other across the dichroic coating, and the color combining prism unit has a shape of plane symmetry about the dichroic coating as a plane of symmetry.

5. The projection display apparatus according to claim 1, wherein
the third and fourth prisms included in the color combining prism unit are arranged opposite to each other across the dichroic coating, and the dichroic coating transmits the first color light modulated by the first light modulation element and reflects the second color light modulated by the second light modulation element to allow the color combining prism unit to combine the colors of the first color light and the second color light.

6. The projection display apparatus according to claim 1, wherein
the light emitted from the light source part includes blue light and yellow light by time-division.

7. The projection display apparatus according to claim 1, wherein
each of the first and the second light modulation elements is reflection-type light modulation element.

8. The projection display apparatus according to claim 1, wherein
the first and the second color lights configure three colors including red light, green light and blue light, and
the first light modulation element modulates the first light color which includes two of the red light, the green light and the blue light.

9. The projection display apparatus according to claim 1, wherein
the one of the two air gap faces is formed with just air between the surface of the first prism and the surface of the third prism, and
the other of the two air gap faces is formed with just air between the surface of the second prism and the surface of the fourth prism.

10. The projection display apparatus according to claim 1, wherein
the surface of the first prism and the surface of the third prism are parallel to each other, and
the surface of the second prism and the surface of the fourth prism are parallel to each other.

11. The projection display apparatus according to claim 1, wherein
the color combining prism unit consists of the first prism, the second prism, the third prism and the fourth prism.

12. A projection display apparatus comprising:
a light source part;

a color separating mirror that separates light emitted from the light source part into a first color light and a second color light;

a first light modulation element that modulates the first color light;

a second light modulation element that modulates the second color light;

a color combining prism unit that combines the first color light modulated by the first light modulation element and the second color light modulated by the second light modulation element; and a projection unit that projects combined light emitted from the color combining prism unit, wherein the color combining prism unit includes a first prism, a second prism, a third prism and a fourth prism, the third and fourth prisms having a dichroic coating located therebetween, the color combining prism unit has two air gap faces that totally reflect the first color light and the second color light which are separated by the color separating mirror, one of the two air gap faces is formed by a surface of the first prism and a surface of the third prism, and another of the two air gap faces is formed by a surface of the second prism and a surface of the fourth prism.

13. The projection display apparatus according to claim 12, wherein the one of the two air gap faces is formed with just air between the surface of the first prism and the surface of the third prism, and the other of the two air gap faces is formed with just air between the surface of the second prism and the surface of the fourth prism.

14. The projection display apparatus according to claim 12, wherein the surface of the first prism and the surface of the third prism are parallel to each other, and the surface of the second prism and the surface of the fourth prism are parallel to each other.

15. The projection display apparatus according to claim 12, wherein the color combining prism unit consists of the first prism, the second prism, the third prism and the fourth prism.

16. A projection display apparatus comprising:

a light source part;

a color separating mirror that separates light emitted from the light source part into a first color light and a second color light;

a first light modulation element that modulates the first color light;

a second light modulation element that modulates the second color light;

a color combining prism unit that combines the first color light modulated by the first light modulation element and the second color light modulated by the second light modulation element; and a projection unit that projects combined light emitted from the color combining prism unit, wherein the color combining prism unit includes a first prism, a second prism, a third prism and a fourth prism, the third and fourth prisms having a dichroic coating located therebetween, the first and second color lights are totally reflected by inner surfaces of the first and the second prisms, respectively, a light emitted from the first prism passes through the dichroic coating, a light emitted from the second prism is reflected by the dichroic coating, a surface of the first prism and a surface of the third prism form a first air gap, and a surface of the second prism and a surface of the fourth prism form a second air gap.

17. The projection display apparatus according to claim 16, wherein the one of the two air gap faces is formed with just air between the surface of the first prism and the surface of the third prism, and the other of the two air gap faces is formed with just air between the surface of the second prism and the surface of the fourth prism.

18. The projection display apparatus according to claim 16, wherein the surface of the first prism and the surface of the third prism are parallel to each other, and the surface of the second prism and the surface of the fourth prism are parallel to each other.

19. The projection display apparatus according to claim 16, wherein the color combining prism unit consists of the first prism, the second prism, the third prism and the fourth prism.

* * * * *